United States Patent
Hashimoto et al.

(10) Patent No.: US 9,049,320 B2
(45) Date of Patent: Jun. 2, 2015

(54) IMAGE PROCESSING APPARATUS INCLUDING A BLANK-AREA IDENTIFYING UNIT AND A CONCEALING UNIT, IMAGE PROCESSING METHOD, AND NON-TRANSITORY COMPUTER READABLE MEDIUM

(75) Inventors: Ryoko Hashimoto, Kanagawa (JP); Koichi Sato, Kanagawa (JP); Mohit Jain, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 159 days.

(21) Appl. No.: 13/551,871

(22) Filed: Jul. 18, 2012

(65) Prior Publication Data
US 2013/0176596 A1    Jul. 11, 2013

(30) Foreign Application Priority Data

Jan. 6, 2012    (JP) ................................ 2012-001539

(51) Int. Cl.
| | |
|---|---|
| *G06K 15/00* | (2006.01) |
| *H04N 1/00* | (2006.01) |
| *G06K 9/20* | (2006.01) |
| *H04N 1/44* | (2006.01) |

(52) U.S. Cl.
CPC .......... *H04N 1/00355* (2013.01); *G06K 9/2054* (2013.01); *H04N 1/00374* (2013.01); *H04N 1/448* (2013.01); *H04N 1/00328* (2013.01)

(58) Field of Classification Search
USPC ........................................ 358/1.18, 1.14, 1.6
See application file for complete search history.

(56) References Cited

U.S. PATENT DOCUMENTS

| | | | | |
|---|---|---|---|---|
| 5,555,556 | A * | 9/1996 | Ozaki .......................... | 382/173 |
| 7,469,063 | B2 * | 12/2008 | Koyama et al. ............... | 382/187 |
| 8,422,106 | B2 * | 4/2013 | Yanagawa ...................... | 358/537 |
| 2007/0081179 | A1 * | 4/2007 | Nishida ......................... | 358/1.11 |
| 2007/0171473 | A1 * | 7/2007 | Iwasaki ......................... | 358/1.18 |
| 2008/0239365 | A1 * | 10/2008 | Salgado et al. ............... | 358/1.15 |
| 2010/0008585 | A1 * | 1/2010 | Saito .............................. | 382/190 |
| 2011/0305387 | A1 * | 12/2011 | Al-Omari et al. ............. | 382/165 |

FOREIGN PATENT DOCUMENTS

| | | |
|---|---|---|
| JP | 7-203180 A | 8/1995 |
| JP | 10-91768 A | 4/1998 |

OTHER PUBLICATIONS

Shafait et al., Performance Evaluation and Benchmarking of Six-Page Segmentation Algorithms, Jun. 2008, IEEE Transactions on Pattern Analysis and Machine Intelligence, vol. 30, No. 6.*

\* cited by examiner

Primary Examiner — Barbara Reinier
(74) Attorney, Agent, or Firm — Sughrue Mion, PLLC

(57) ABSTRACT

An image processing apparatus includes following components. A blank-area identifying unit identifies a blank area having a size exceeding a predetermined size, from a non-specifying-mark image portion of a recording area image of a recording area that includes individual images and a specifying mark specifying an area containing images among the individual images. A concealing unit conceals a divided area specified by the specifying-mark image, among divided areas obtained by dividing a non-blank area by a gap having a width equal to or larger than a threshold in a specific direction, among gaps between the individual images arranged in the specific direction in the non-blank area. The non-blank area is an area of the non-specifying-mark image portion of the recording area image other than the blank area identified by the blank-area identifying unit.

15 Claims, 13 Drawing Sheets

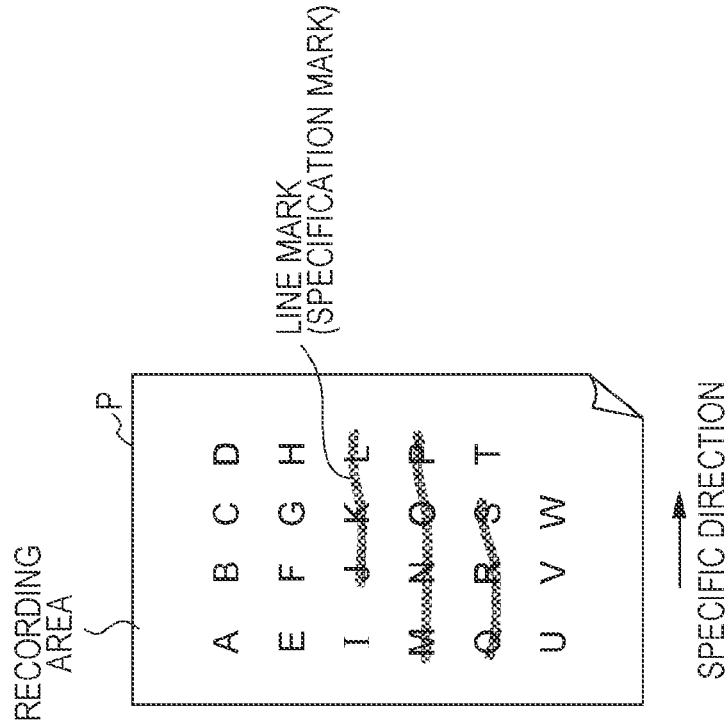
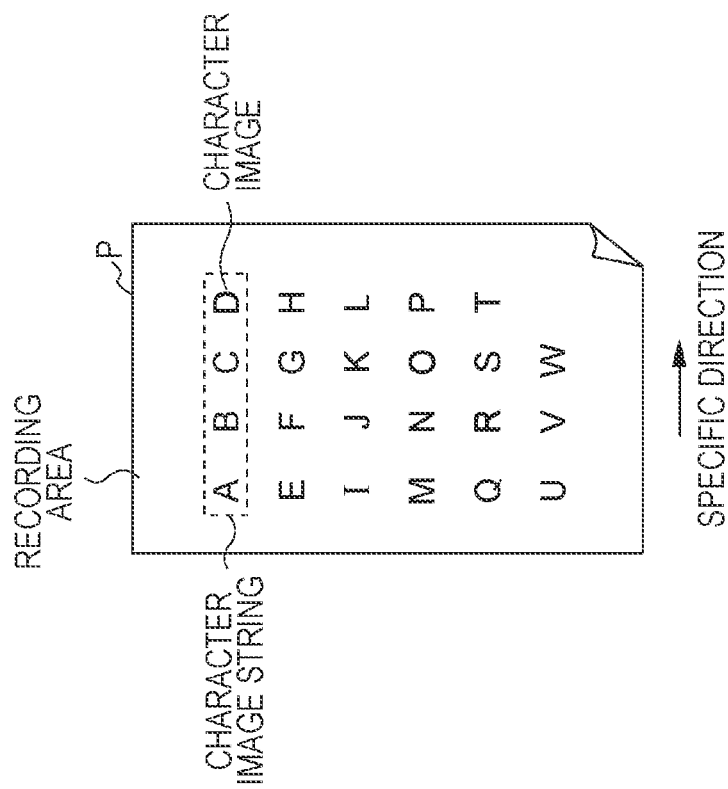

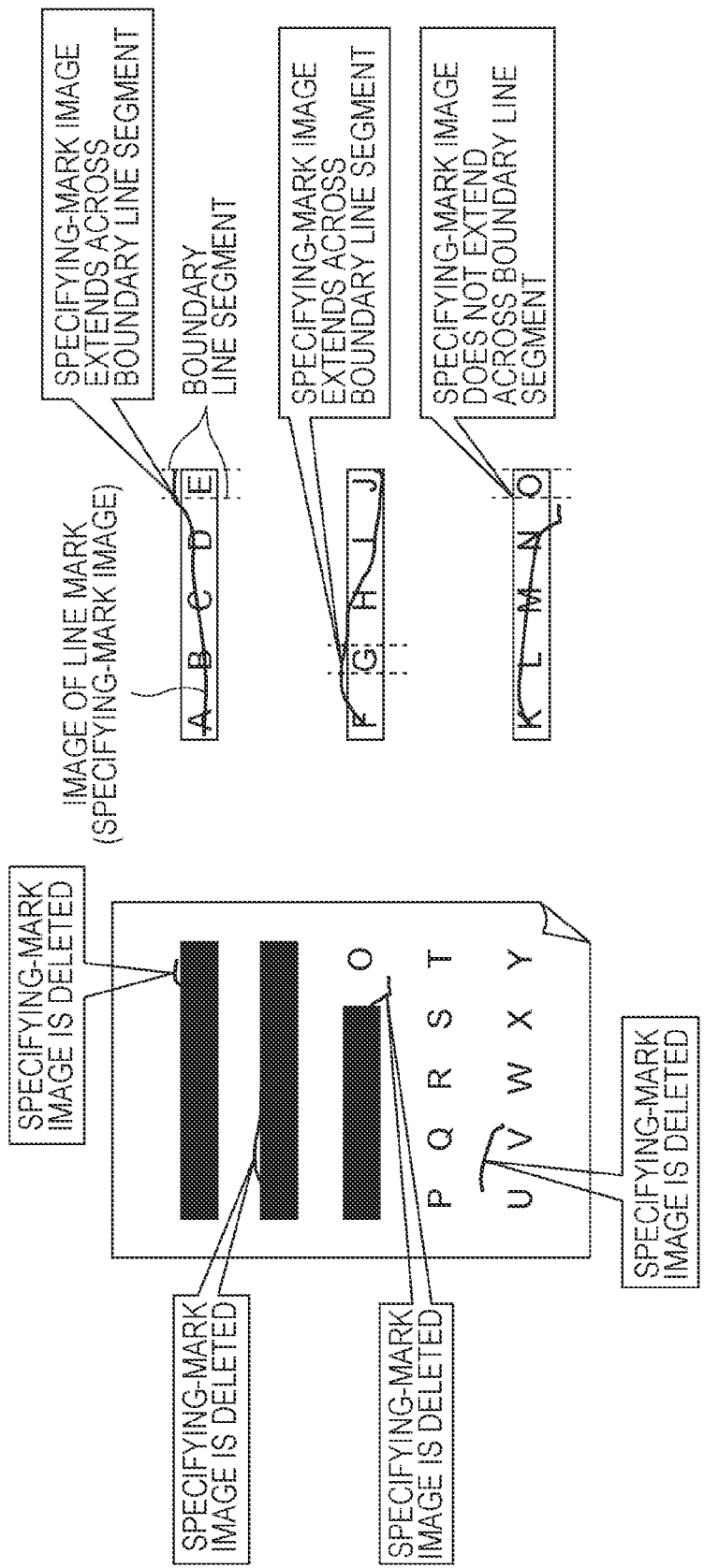

IMAGE PROCESSING APPARATUS INCLUDING A BLANK-AREA IDENTIFYING UNIT AND A CONCEALING UNIT, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-001539 filed Jan. 6, 2012.

BACKGROUND

Technical Field

The present invention relates to an image processing apparatus, an image processing method, and a non-transitory computer readable medium.

SUMMARY

According to an aspect of the invention, there is provided an image processing apparatus including a blank-area identifying unit and a concealing unit. The blank-area identifying unit identifies a blank area having a size exceeding a predetermined size, from a non-specifying-mark image portion of a recording area image of a recording area that includes individual images and a specifying mark specifying an area containing images among the individual images. The non-specifying-mark image portion is an image portion of the recording area image other than a specifying-mark image that represents the specifying mark. The recording area image is represented by image information. The concealing unit conceals a divided area specified by the specifying-mark image, among divided areas obtained by dividing a non-blank area by a gap having a width equal to or larger than a threshold in a specific direction, among gaps between the individual images arranged in the specific direction in the non-blank area. The non-blank area is an area of the non-specifying-mark image portion of the recording area image other than the blank area identified by the blank-area identifying unit.

BRIEF DESCRIPTION OF THE DRAWINGS

An exemplary embodiment of the present invention will be described in detail based on the following figures, wherein:

FIG. 7 is a schematic diagram illustrating an example of a recording area that includes images to be concealed by the image processing apparatus according to the exemplary embodiment;

FIG. 8 is a schematic diagram illustrating an example case in which a line mark is recorded in a recording area that includes images to be concealed by the image processing apparatus according to the exemplary embodiment;

FIG. 17 describes the modifications of the concealing process performed by the image processing apparatus according to the exemplary embodiment (part 2);

FIG. 18 describes the modifications of the concealing process performed by the image processing apparatus according to the exemplary embodiment (part 3);

DETAILED DESCRIPTION

An exemplary embodiment of the present invention will be described in detail below with reference to the accompanying drawings.

Figure 1:
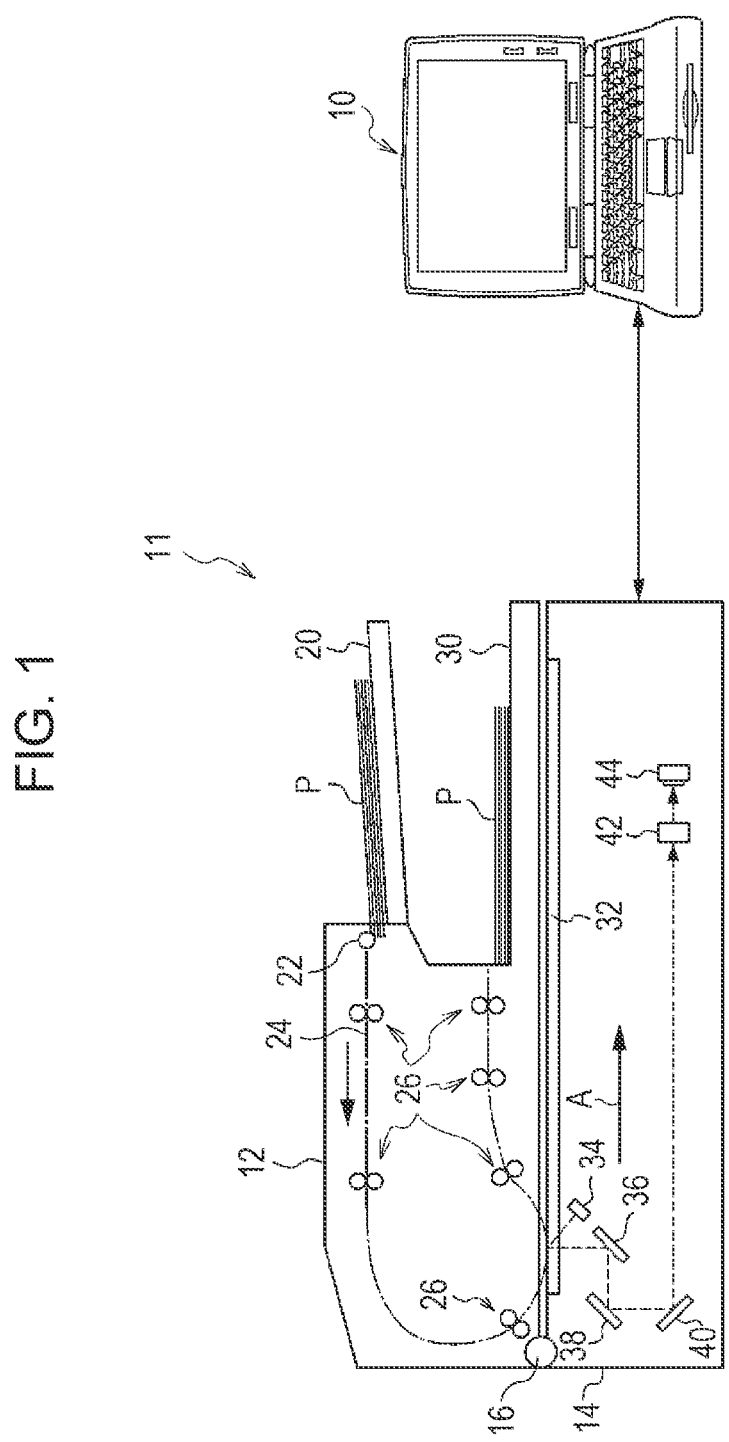
FIG. 1 illustrates an example of configurations of an image processing apparatus and an image reading apparatus according to an exemplary embodiment.

FIG. 1 illustrates an image processing apparatus 10 according to this exemplary embodiment. In this exemplary embodiment, a personal computer is used as the image processing apparatus 10. However, the image processing apparatus 10 is not limited to this example, and may be any computer, e.g., a microcomputer, as long as the computer is capable of executing a concealing processing program to be described later.

As illustrated in FIG. 1, an image reading apparatus 11 is connected to the image processing apparatus 10. The image reading apparatus 11 includes a document transporting section 12 and an image reading section 14. The document transporting section 12 and the image reading section 14 are connected by a connecting part 16. The document transporting section 12 is rotatable around the connecting part 16 in a direction in which the document transporting section 12 approaches or is separated from the image reading section 14. When the document transporting section 12 is rotated in the direction in which the document transporting section 12 is separated from the image reading section 14, a platen glass 32 to be described later is exposed.

The document transporting section 12 includes a document table 20 on which a document P having an image recorded in a recording area is to be positioned. The document P positioned on the document table 20 is picked up by a pickup roller 22 one by one and is fed along a transport path 24. The document P having been fed along the transport path 24 is transported by pairs of transport rollers 26 to the document reading position, where the image reading section 14 reads the image recorded on one side of the document P. Then, the document P is discharged to a discharge portion 30, which is disposed on the downstream side of the document reading position in the transporting direction of the document P.

The image reading section 14 includes the transparent platen glass 32, on which the document P is to be positioned. The aforementioned document reading position is on the platen glass 32. Below the platen grass 32 at the document reading position, disposed are a light source 34 that emits light toward a surface of the document P, a first reflection mirror 36 that receives the light reflected by the surface of the document P, a second reflection mirror 38 that bends the traveling direction of the light reflected by the first reflection mirror 36, and a third reflection mirror 40 that further bends the traveling direction of the light reflected by the second reflection mirror 38 to another direction.

The image reading section 14 also includes a lens 42 and a light detection unit 44 including many photoelectric conversion sensors that are arranged in a line on a light receiving surface. The lens 42 forms an image corresponding to the light reflected by the third reflection mirror 40 on the light receiving surface of the light detection unit 44. The light detection unit 44 then divides the image into many pixels of red (R), green (G), and blue (B) color components, whereby the image reading section 14 reads the image recorded on the surface of the document P.

A fluorescent lamp is used as the light source 34 in this exemplary embodiment. However, the light source 34 is not limited to this type, and a light source of another type, such as plural light emitting diodes (LEDs) arranged along a direction that crosses the transporting direction of the document P, may be used. Also, a charge coupled device (CCD) line sensor is used as the light detection unit 44 in this exemplary embodiment. However, the light detection unit 44 is not limited to this type, and a solid-state imaging element of another type, such as a complementary metal-oxide semiconductor (CMOS) image sensor, may be used.

In the image reading apparatus 11 according to this exemplary embodiment, the light source 34, the first reflection mirror 36, the second reflection mirror 38, and the third reflection mirror 40 move along the arrow-A direction (and the opposite direction) illustrated in FIG. 1. Suppose that the document P is positioned on the platen glass 32, which is exposed as a result of rotation of the document transporting section 12 in the direction in which the document transporting section 12 is separated from the image reading section 14. In this case, the light source 34, the first reflection mirror 36, the second reflection mirror 38, and the third reflection mirror 40 move along the arrow-A direction with the document P being irradiated with light emitted from the light source 34, whereby an image recorded in a recording area, i.e., on the surface of the document P (the surface that is in contact with the upper surface of the platen glass 32), is read (all over the recording area).

Figure 2:
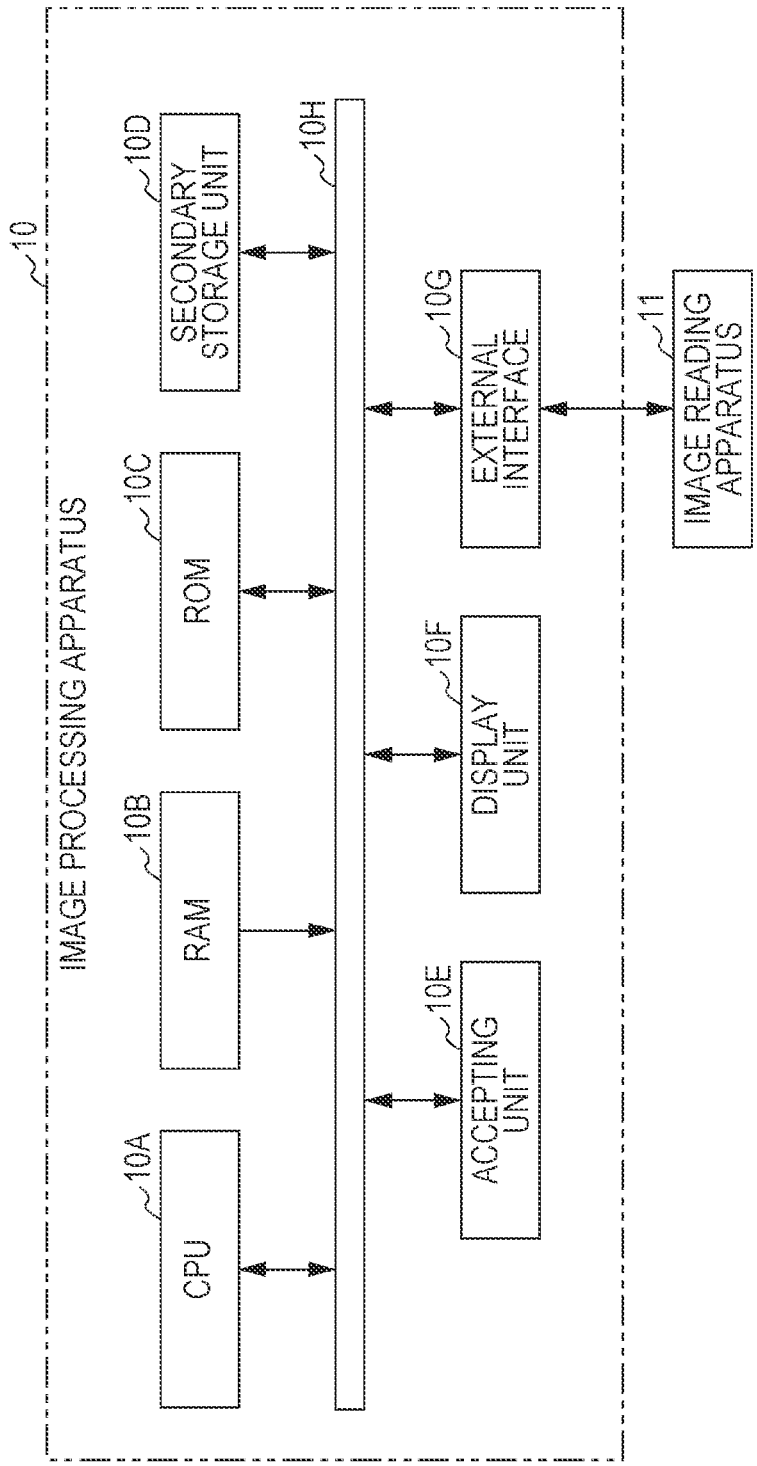
FIG. 2 is a block diagram illustrating an example of an electrical configuration of the image processing apparatus according to the exemplary embodiment.

FIG. 2 illustrates an example of an electrical configuration of the image processing apparatus 10 according to this exemplary embodiment. As illustrated in FIG. 2, the image processing apparatus 10 includes a central processing unit (CPU) 10A that controls operations of the image processing apparatus 10; a random access memory (RAM) 10B that is used as a work area or the like when various processing programs are executed by the CPU 10A; a read only memory (ROM) 10C that pre-stores the various control programs, various parameters, and so forth; a secondary storage unit 10D (e.g., a hard disk drive) that serves as a storage unit for used in storing various kinds of information; an accepting unit 10E (e.g., a mouse and a keyboard) that accepts various kinds of information; a display unit 10F (e.g., a liquid crystal display) that displays various kinds of information; and an external interface 10G that is connected to an external device (e.g., the image reading apparatus 11 herein), such as a printer (image forming apparatus), a personal computer (PC), or the image reading apparatus 11, and that sends image information to the external device and sends and receives various kinds of information to and from the external apparatus. These components are electrically interconnected via a bus 10H, such as an address bus, a data bus, or a control bus.

The CPU 10A accesses the RAM 10B, the ROM 10C, and the secondary storage unit 10D, acquires various kinds of information accepted via the accepting unit 10E, displays various kinds of information on the display unit 10F, and exchanges various kinds of information with the image reading apparatus 11 via the external interface 10G.

The image processing apparatus 10 configured in this manner has functions of performing various kinds of processing on image information that represents an image recorded in a recording area of the document P. One of these functions is a concealing processing function of performing a concealing process on an area (hereinafter, referred to as a "to-be-concealed area") specified and to be concealed in the image represented by the image information input from the image reading apparatus 11. The term "to conceal" used herein includes not only to fill a to-be-concealed area in a specific color so that the to-be-concealed area is not visually recognized but also to superimpose a pattern or design so that the to-be-concealed area is visually recognized only partially.

Figure 3:
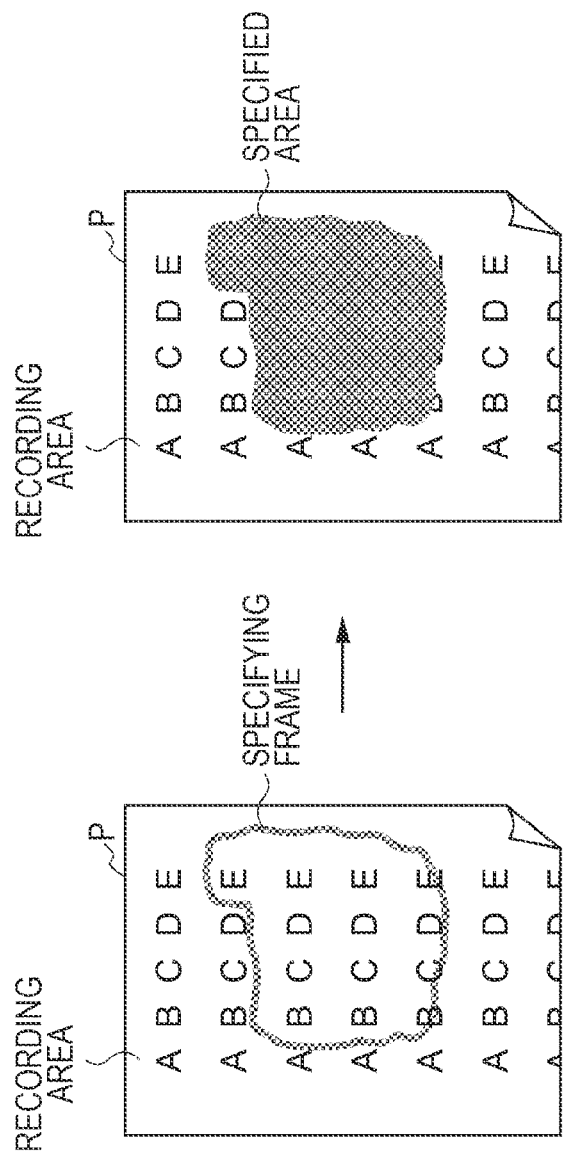
FIG. 3 is a schematic diagram illustrating methods for specifying a to-be-concealed area (part 1)
Figure 4:
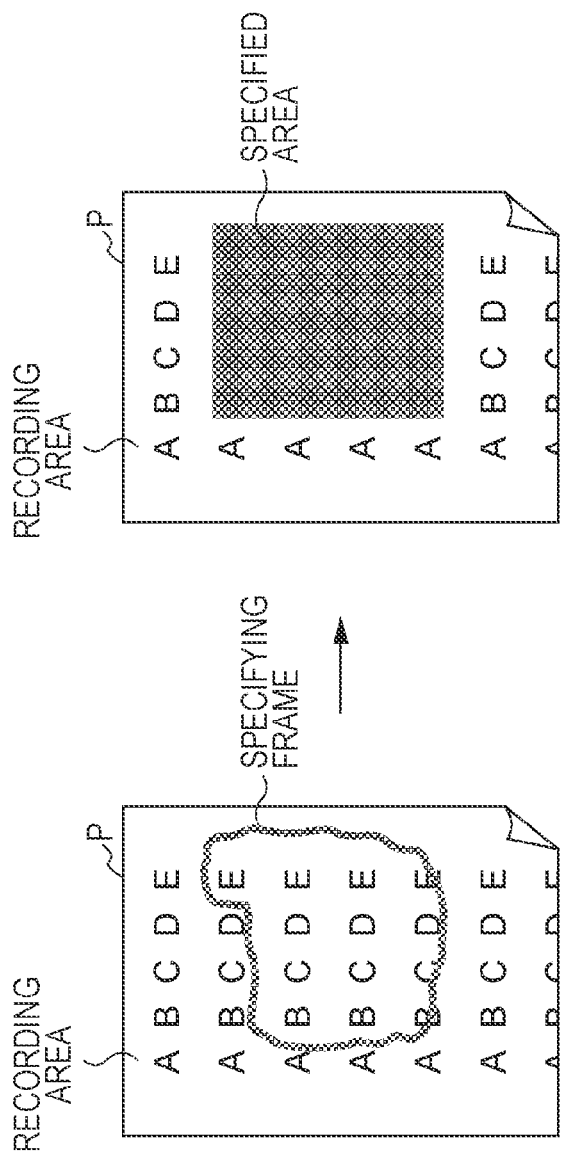
FIG. 4 is a schematic diagram illustrating the methods for specifying a to-be-concealed area (part 2)

To start the concealing processing function of the image processing apparatus 10, a to-be-concealed area in an image recorded in the recording area of the document P is specified first. Examples of the method for specifying a to-be-concealed area according to the related art include a specification method using a line (hereinafter, referred to a "specifying frame") that represents a mark of a polygonal frame (or a curved frame) as illustrated in FIGS. 3 and 4. Specific examples of the specification method using the specifying frame include a method illustrated in FIG. 3 in which an area surrounded by the specifying frame is set as an area specified (hereinafter, referred to as a specified area) by recording the specifying frame in the recording area and a method illustrated in FIG. 4 in which an area surrounded by a circumscribed rectangle of the specifying frame is set as the specified area. In the related art, the specified area specified by using such specification methods is concealed as the to-be-concealed area by using a predetermined concealing method (uniform concealing method).

Figure 5:
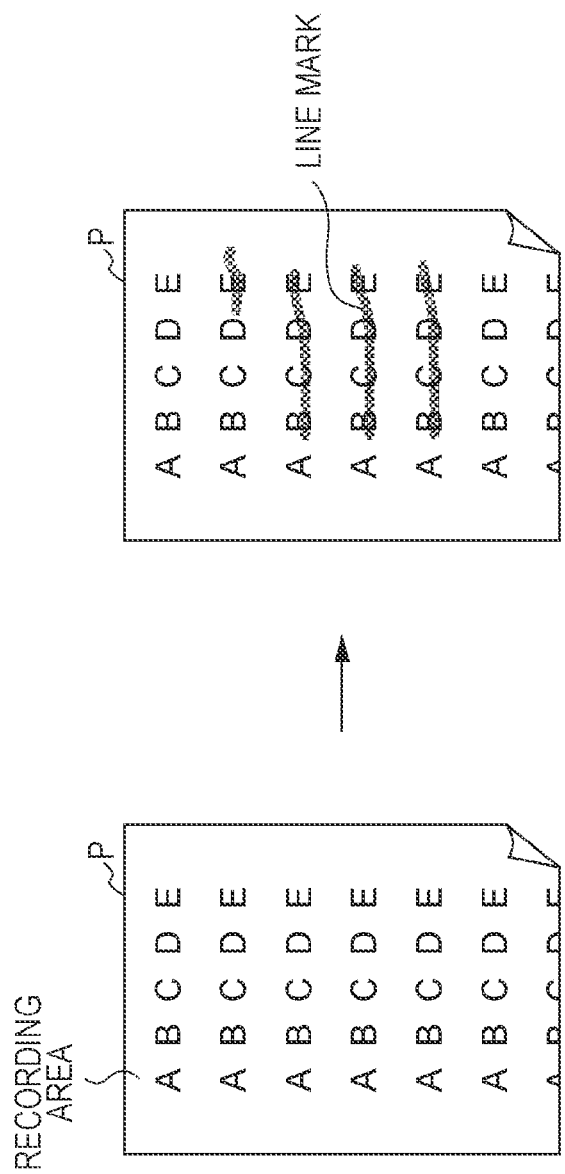
FIG. 5 is a schematic diagram illustrating the methods for specifying a to-be-concealed area (part 3)

As another method for specifying a to-be-concealed area, a specification method illustrated in FIG. 5 is known, for example. Specifically, the specification method illustrated in FIG. 5 is a method in which a to-be-concealed area is specified by using a line representing a line-shaped mark (hereinafter, referred to as a "line mark" and is also referred to as a "specifying mark" when distinction between the "line mark" and the "specifying frame" is not desired). In this method, for example, an area surrounded by a circumscribed rectangle of each line mark recorded in the recording area is specified as the specified area. In the related art, the specified area specified by using this specification method is concealed as the to-be-concealed area by using a predetermined concealing method.

The specifying mark used in this exemplary embodiment has an attribute different from an attribute of an image (hereinafter, referred to as a "to-be-concealed image") that is recorded in the recording area and is other than the specifying mark. Specifically, the to-be-concealed image is an image recorded with a colorant of an achromatic color (e.g., black herein), whereas the specifying mark is a thick-line image, through which the to-be-concealed image (the image under the specifying mark) is visually recognized in an area where the specifying mark is superimposed on the to-be-concealed image. The specifying mark is recorded with a writing material (e.g., a highlighter) that applies a colorant of a chromatic color (e.g., fluorescent pink) that is recognized by the image reading apparatus 11. Hereinafter, the description will be given on the assumption that the predominant color of the document P is white, the to-be-concealed image is recorded with the black colorant on the white document P, and the specifying mark is recorded in the recording area with a highlighter.

In the image processing apparatus 10 according to this exemplary embodiment, various processes for realizing the concealing processing function are implemented by using a software-based configuration. One example of the software-based configuration is a configuration in which a program is executed by a computer. However, the concealing processing function is not limited to software-based implementation and may be implemented by hardware or a combination of hardware and software.

A case will be described below in which the CPU 10A of the image processing apparatus 10 according to this exemplary embodiment executes a concealing processing program, thereby implementing the concealing processing function. In this case, the concealing processing program may be previously stored in the secondary storage unit 10D, may be supplied after being stored on a computer readable recording medium, or may be distributed via a wired or wireless communication medium.

Figure 6:
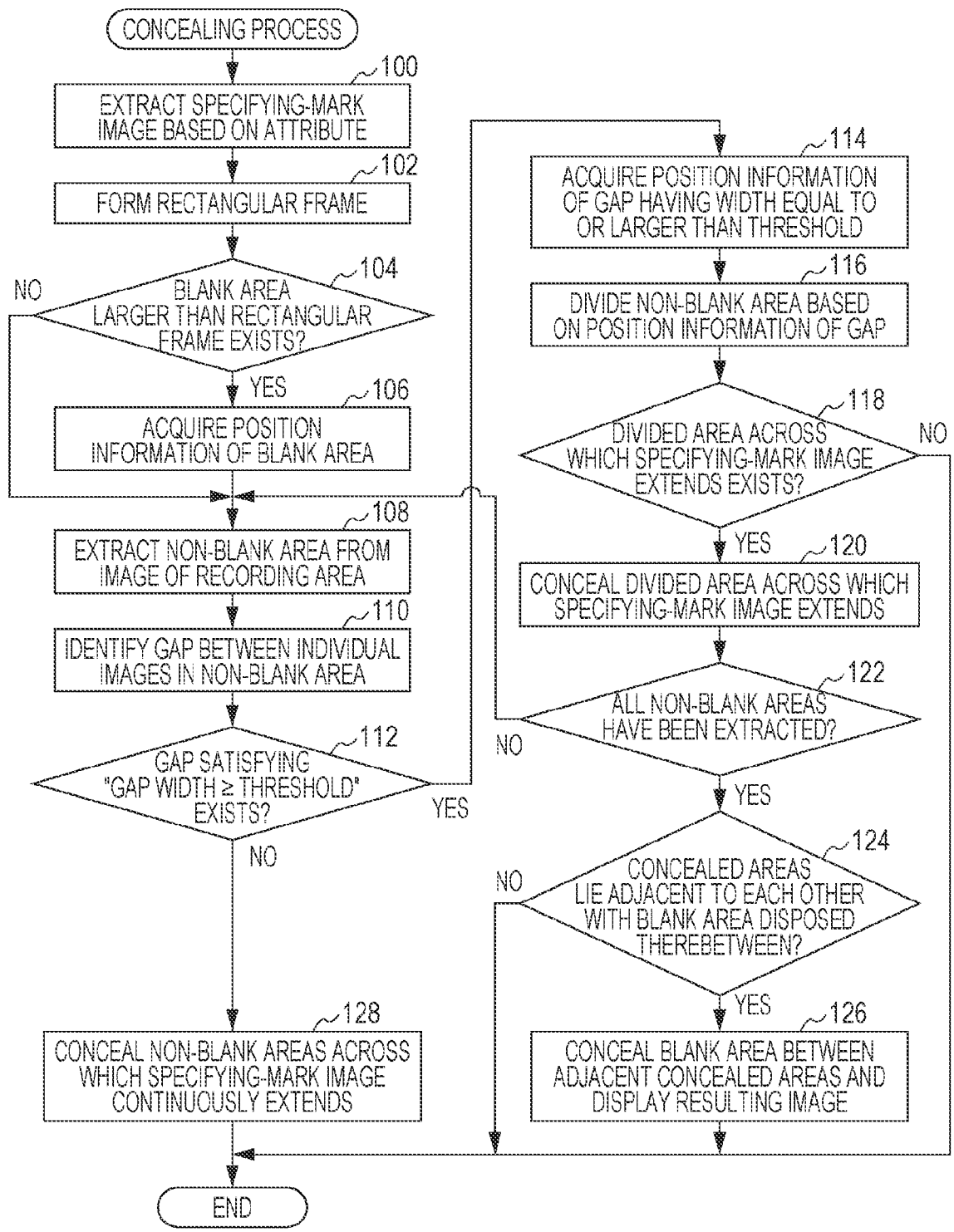
FIG. 6 is a flowchart illustrating an example of a processing flow of a concealing processing program according to the exemplary embodiment.

FIG. 6 is a flowchart illustrating an example of a processing flow of the concealing processing program according to this exemplary embodiment. To avoid confusion, a case will be described below in which image information supplied to the image processing apparatus 10 from the image reading apparatus 11 is to be processed. The image information (hereinafter, referred to as "to-be-processed image information") represents the entire image of a recording area in which plural character image strings (i.e., an example of groups of specific images) are recorded for plural lines and a line mark is recorded as the specifying mark as illustrated in FIG. 8, for example. In each character image string, plural character images (i.e., an example of plural specific images) recorded by using black colorant in the recording area of the white document P (e.g., A4-side document P herein) illustrated in FIG. 7, for example, are arranged in a specific direction (in the width direction of the A4-size document P in the example illustrated in FIG. 7). Also, to avoid confusion, in the case described below, the size of the character images is set to 12 point (pt). Furthermore, to avoid confusion, in the case described below, only the character images and the image representing the line mark are included in the image of the recording area that is represented by the to-be-processed image information.

Figure 9:
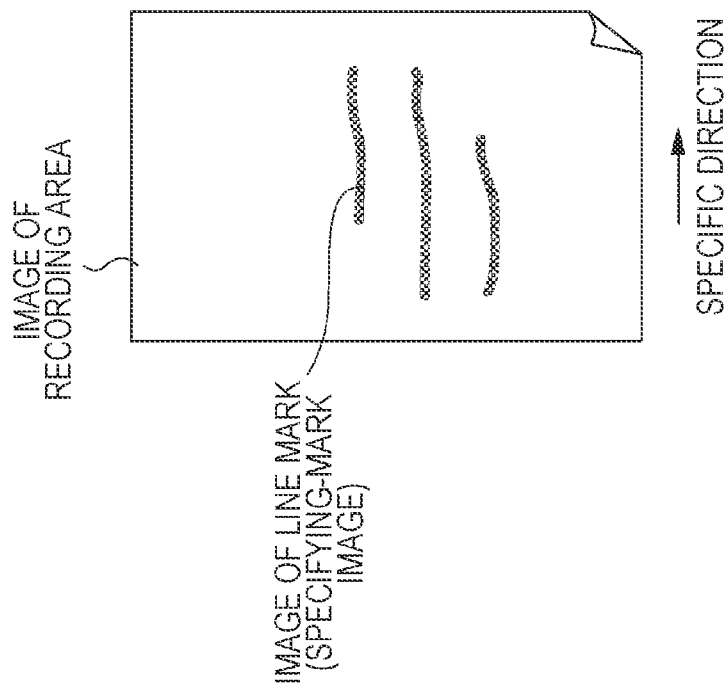
FIG. 9 is a schematic diagram illustrating an example of an image of the line mark that is extracted from the image of the recording area that includes images to be concealed by the image processing apparatus according to the exemplary embodiment.

In step 100 of FIG. 6, an image (hereinafter, referred to as a "specifying-mark image") representing an area specified by the specifying mark is extracted from the image of the recording area represented by the to-be-processed image information, on the basis of the attribute of the specifying mark. The process then proceeds to step 102. FIG. 9 illustrates an example of the extracted specifying-mark image. As illustrated in FIG. 9, in processing of step 100 described above, an image representing an area including the line mark illustrated in FIG. 8 is extracted as the specifying-mark image. Here, extraction of the specifying-mark image is not limited to extraction based on the attribute of the specifying mark. For example, the specifying-mark image may be extracted on the basis of the attribute of the to-be-concealed image in step 100 described above. In this case, an image other than that having the attribute of the to-be-concealed image is determined as the specifying-mark image, and is extracted.

Figure 10:
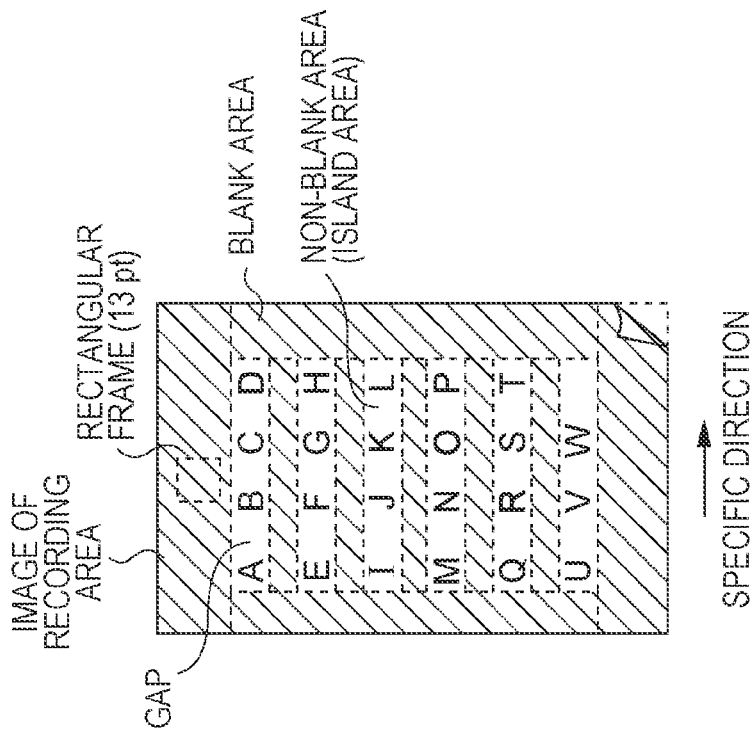
FIG. 10 is a schematic diagram illustrating an example case in which the image of the recording area that includes images to be concealed by the image processing apparatus according to the exemplary embodiment is partitioned into blank areas and non-blank areas.

In step 102, a rectangular frame (e.g., a square frame herein) having a predetermined size is formed. The process then proceeds to step 104. The "rectangular frame" used herein is a frame that is larger than a "predetermined individual image", which is for example a predetermined 12-pt character image. The rectangular frame is, for example, a rectangular frame having a size equivalent to the size of a 13-pt character image as illustrated in FIG. 10. The "rectangular frame having a size equivalent to the size of a 13-pt character image" is, for example, a circumscribed rectangle of a sample character image (e.g., a 13-pt character image "A"). Although the rectangular frame is used in this exemplary embodiment, a circular frame or a polygonal frame other than the rectangular frame may be used.

In step 104, it is determined whether or not the image of the recording area represented by the to-be-processed image information includes a blank area larger than the rectangular frame formed in step 102. If the determination result is yes, the process proceeds to step 106. On the other hand, if the determination result is no, the process proceeds to step 108. For example as illustrated in FIG. 10, blank areas (hatched areas illustrated in FIG. 10) are detected by applying the single rectangular frame formed in step 102 to the image of the recording area. However, the detection method is not limited to this example. For example, blank areas may be detected by using the rectangular frame and another rectangular frame that is larger than this rectangular frame. Alternatively, blank areas may be detected by using plural rectangular frames having sizes that differ from each other in steps. With this configuration, a range recognized as the blank area may be widened. Although it is determined whether or not there is a blank area larger than the rectangular frame by using the rectangular frame larger than the 12-pt character image in this exemplary embodiment, the size of the rectangular frame is not limited to this size. The rectangular frame may be smaller than the size of the 12-pt character image and larger than a predetermined size. The "predetermined size" used in this case may be the size of a blank area that is formed by a circumscribed rectangle of a character image recorded in the recording area and by the character image included in this circumscribed rectangle, the size of a blank area included in the character image, or the size of a blank area that is expected as a gap between the character images.

In step 106, blank-area position information representing the position of the blank area in the image of the recording area represented by the to-be-processed image information is acquired and stored in a predetermined storage area α1 (e.g., a predetermined storage area of the RAM 10B). The process then proceeds to step 108.

In step 108, from among areas (hereinafter, referred to as "non-blank areas") other than the blank area of the image of the recording area represented by the to-be-processed image information, a single non-blank area that has not undergone processing in step 110 to be described later is extracted on the basis of the blank area position information stored in the storage area α1. The process then proceeds to step 110. The "single non-blank area" used herein indicates, for example, an area other than the blank area illustrated in FIG. 10 (an island area including a character image string in the image of the recording area in the example illustrated in FIG. 10).

In step 110, a gap between individual images is identified within the non-blank area extracted in step 108. The process then proceeds to step 112. The "individual image" used herein indicates an aggregate of consecutive pixels of a specific color (e.g., black for the character image here), namely, an image recognized as an aggregate of plural adjacent consecutive pixels of a specific color (black). In the example illustrated in FIG. 10, each of images for alphabets "A", "B", . . . , "W" corresponds to the individual image.

In step 112, it is determined whether or not the size of the gap (the gap width) between the individual images specified in step 110 is equal to or larger than a threshold. If the determination result is yes, the process proceeds to step 114. If the determination result is no, the process proceeds to step 128. The "threshold" used herein is, for example, a value representing a predetermined width of a gap between 12-pt character images, and is set prior to execution of this concealing processing program. To avoid confusion, a case in which the width of gaps between all character images is set equal to or larger than the threshold is illustrated in the example of FIG. 10.

Figure 11:
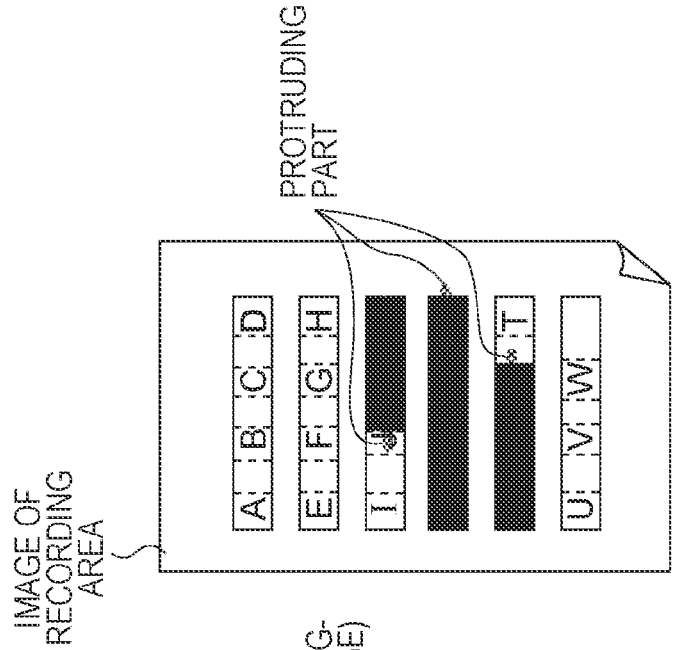
FIG. 11 is a schematic diagram illustrating an example case in which each non-blank area in the image of the recording area that includes images to be concealed by the image processing apparatus according to the exemplary embodiment is divided.

In step 114, gap position information is acquired which indicates the position of the gap identified in step 110 within the recording area. The process then proceeds to step 116. In step 116, the non-blank area extracted in step 108 is divided by the gap identified in step 110, on the basis of the gap position information acquired in step 114. FIG. 11 schematically illustrates an example of division of a non-blank area. As illustrated in FIG. 11, in this exemplary embodiment, each area partitioned by the gap identified in step 110 and the outline of the non-blank area extracted in step 108 is set as a divided area.

In step 118, it is determined whether or not there is a divided area, completely across which the specifying-mark image extracted in step 100 extends in a specific direction, among the divided areas obtained from the division performed in step 116. That is, it is determined whether or not there is a divided area completely across which the specifying-mark image lies in the specific direction (in the example illustrated in FIG. 11, a divided area in which the specifying-mark image extends completely across a pair of opposing sides in the specific direction (boundary line segments having a predetermined length that indicate the boundary of the divided area in the specific direction)). If the determination result in step 118 is no, this concealing processing program is terminated. On the other hand, if the determination result is yes, the process proceeds to step 120. When the determination result in step 118 is no, a specification error message indicating that it is highly probable that the area is not correctly specified or an error message indicating that the concealing processing is not performed may be displayed on the display unit 10F before the concealing processing program is terminated.

Figure 12:
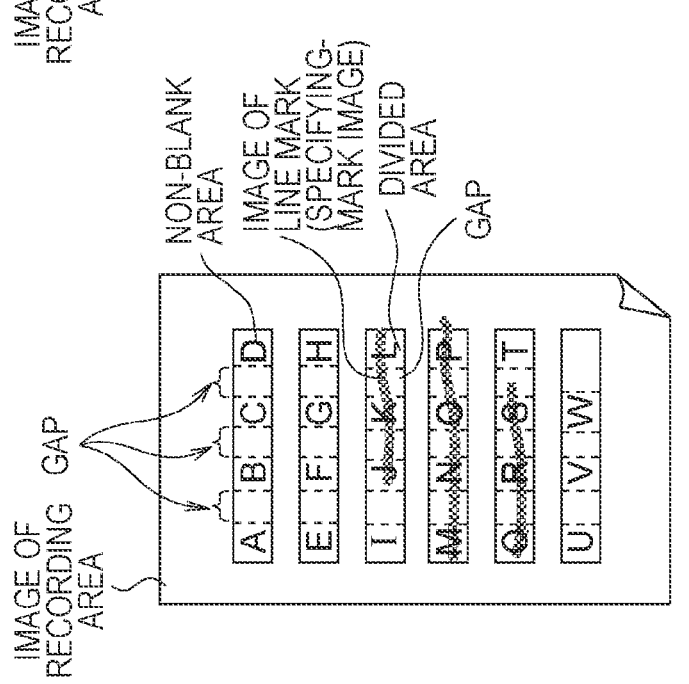
FIG. 12 is a schematic diagram illustrating an example case in which the non-blank areas in the image of the recording area that includes images to be concealed by the image processing apparatus according to the exemplary embodiment are concealed (before removal of parts protruding from the concealed areas)
Figure 13:
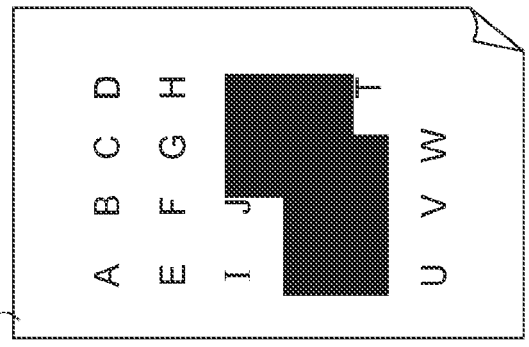
FIG. 13 is a schematic diagram illustrating an example case in which the non-blank areas in the image of the recording area that includes images to be concealed by the image processing apparatus according to the exemplary embodiment are concealed (after removal of the parts protruding from the concealed areas)

In step 120, the divided areas completely across which the specifying-mark image extracted in step 100 extends in the specific direction are concealed by filling the divided area, and the gaps between the concealed divided areas are also concealed by filling the gaps. That is, the entire area of the non-blank area is concealed which includes a series of boundary line segments of divided areas, completely across which an image area equivalent to an area specified by the specifying mark represented by the specifying-mark image extends in the specific direction. In an example illustrated in FIG. 11, the line mark, i.e., the specifying-mark image, extends over "J", "K", "L", "M", "N", "O", "P", "Q", "R", and "S". Among these divided areas, to-be-concealed divided areas are the divided areas including "K", "L", "M", "N", "O", "P", "Q", "R", and "S", except for the divided area including "J". The divided area including "J" is not to be concealed because the line mark does not extend completely across the divided area in the specific direction. The to-be-concealed divided areas and the gaps between these divided areas are concealed as a result of execution of processing in step 120. As illustrated in FIG. 12, the line mark protrudes to the divided area including "J" and to the gap between the divided areas including "S" and "T". Also, the line mark protrudes from the right end of the non-blank area in the fourth row from the top of the image of the recording area illustrated in FIG. 12. These protruding parts are parts of the line mark that are not included in the to-be-concealed area. In this case, the protruding parts illustrated in FIG. 12 may be removed as illustrated in FIG. 13, for example.

In step 120, the entire area surrounded by the outline of each to-be-concealed divided area and the entire area surrounded by the outline of each to-be-concealed gap are concealed by filling these areas. However, the configuration is not limited to this example. The divided areas and the gaps may be partially concealed (e.g., margins are provided at the top and bottom parts of the divided areas and the gaps, and a portion between the margins may be concealed by filling this portion). Alternatively, the gaps may be excluded from the to-be-concealed areas and only the divided areas may be concealed.

Subsequently, in step 122, it is determined whether or not all non-blank areas have been extracted from the image of the recording area represented by the to-be-processed image information. If the determination result is no, the process returns to step 108. If the determination result is yes, the process proceeds to step 124. In step 124, it is determined, on the basis of the blank area position information stored in the storage area α1, whether or not areas that have already been concealed within the non-blank areas (hereinafter, referred to as "concealed areas") lie adjacent to each other with a blank area disposed therebetween. In the examples illustrated in FIGS. 11 to 13, it is determined whether or not the concealed divided areas, among the divided areas resulting from the division performed in step 116, and the concealed gaps, lie adjacent to each other with a blank area disposed therebetween. If the determination result in step 124 is no, the concealing processing program is terminated. If the determination result is yes, the process proceeds to step 126.

Figure 14:
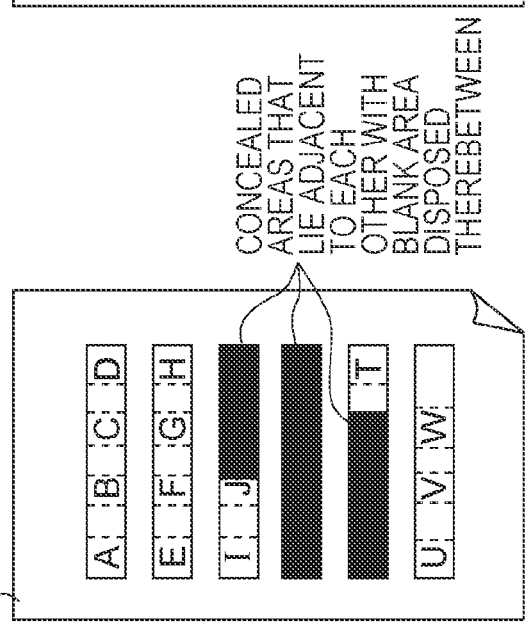
FIG. 14 is a schematic diagram illustrating an example case in which each blank area sandwiched by the concealed non-blank areas in the image of the recording area that includes images to be concealed by the image processing apparatus according to the exemplary embodiment is further concealed.

In step 126, a blank area disposed between the concealed areas is concealed. The resulting image of the recording area is displayed on the display unit 10F. Then, the concealing processing program is terminated. FIG. 14 illustrates an example in which blank areas between the concealed areas illustrated in FIG. 13 are concealed. In the example illustrated in FIG. 14, blank areas sandwiched by the island areas, which include the divided areas and gaps concealed in step 120, illustrated in FIG. 13, are concealed.

If the determination result in step 112 is no, the process proceeds to step 128. In step 128, non-blank areas across which the specifying-mark image extracted in step 100 is continuously recorded in the specific direction, among the non-blank areas extracted in step 108, are concealed. The resulting image of the recording area is displayed on the display unit 10F. Then, the concealing processing program is terminated. Although the non-blank areas are concealed in step 128, for example, the concealing processing program may be terminated after displaying a specification error message or concealment error message instead of concealing the non-blank areas or the concealing processing program may be terminated without performing any processing.

As described above in detail, blank areas larger than a predetermined size are identified from the non-specifying-mark image portion of the image of the recording area represented by the to-be-processed image information. Areas other than the blank areas identified in the non-specifying-mark image portion of the image of the recording area are defined as non-blank areas. Each non-blank area is divided into divided areas by gaps having a width equal to or larger than a threshold in the specific direction, among gaps between character images arranged in the specific direction included in the non-blank area. Among the divided areas, divided areas completely across which the specifying-mark image extends in the specific direction are concealed.

Figure 15:
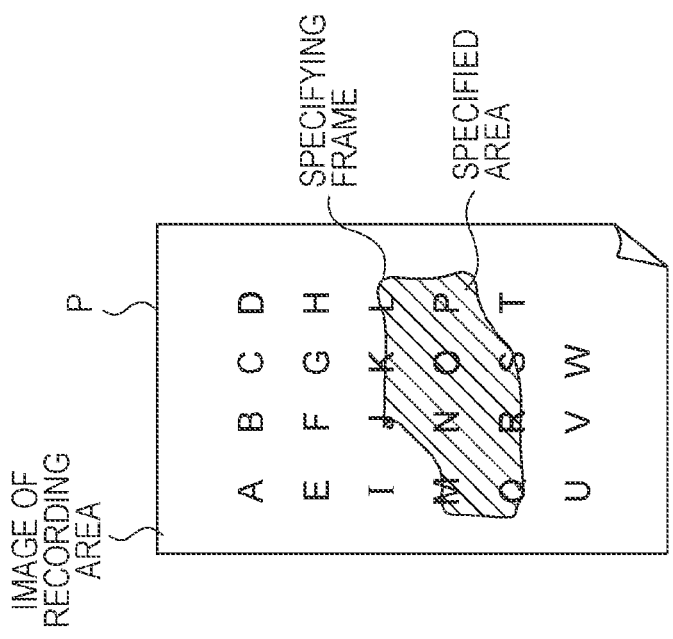
FIG. 15 is a schematic diagram illustrating an example case in which a specifying frame is recorded in a recording area that includes images to be concealed by the image processing apparatus according to the exemplary embodiment.

In the above exemplary embodiment, the example case has been described in which the to-be-concealed area is specified by using the line mark. However, the to-be-concealed area may be specified by using a specifying frame. For example, in order to set the entire area surrounded by the specifying frame as a specified area and conceal an area equivalent to the to-be-concealed area described in the exemplary embodiment above, the specifying frame may be recorded in the recording area of the document P in a manner illustrated in FIG. 15, for example. Although the to-be-concealed area is specified from the position immediately above the character image "T" in the example illustrated in FIG. 15, the configuration is not limited to this example. The to-be-concealed area may be specified from the position immediately below the character image "P". As described above, it is not necessary to set the area surrounded by the specifying frame as the to-be-concealed area as it is. Instead, an area obtained by changing the shape of the area surrounded by the specifying frame (e.g., an area obtained by enlarging or reducing the specified area in accordance with a predetermined rule) may be set as the to-be-concealed area.

In the above exemplary embodiment, divided areas are formed with gaps disposed therebetween. However, the configuration is not limited to this example, and the divided areas may be formed by using the center of each identified gap as the boundary. In this case, the to-be-concealed area does not include gaps. Thus, processing for concealing the gaps separately from the divided areas may be omitted.

In the above exemplary embodiment, gaps between to-be-concealed divided areas are concealed. However, the gaps do not have to be concealed. For example, when it is sufficient to conceal only character images, gaps between the character images do not have to be concealed. However, for the aesthetic purpose or when the content recorded in the recording area may be estimated in a state where only divided areas are concealed, the divided areas and the gaps are desirably concealed as described in the exemplary embodiment above.

In the above exemplary embodiment, the case has been described in which the size of the rectangular frame formed in step 102 is set to 13 pt because the sizes of character images included in the image of the recording area are uniform, i.e., 12 pt. However, when the sizes of the character images vary, the size of the rectangular frame may be desirably set to the size of the largest character image among the character images included in the image of the recording area. With this configuration, occurrence of a situation may be avoided in which an area including a character image is erroneously recognized as a blank area even though the character image actually exists in the area. This method is similarly applied to images other than character images. When character images and non-character images coexist, a rectangular frame larger than the largest image among these images may be formed.

In the above exemplary embodiment, the case has been described in which it is known that the sizes of character images are uniform, i.e., 12 pt. However, the configuration is not limited to this example, and the largest image may be identified by detecting the sizes of the character images. In this case, for example, circumscribed rectangles are formed for aggregates of pixels of a specific color that continuously lie in the image of the recording area. An image (an aggregate of continuous pixels of the specific color) included in the largest circumscribed rectangle is identified as the largest image.

In the above exemplary embodiment, the example case has been described in which the specifying-mark image is extracted on the basis of the attribute of the specifying mark in step 100. However, the processing in step 100 is not mandatory. For example, a user may manually specify and extract the specifying-mark image by using a pointing device, such as a stylus or mouse.

In the above exemplary embodiment, the example case has been described in which a gap having a width that is equal to or larger than a threshold is identified in step 112. However, the processing in step 112 is not mandatory. For example, a user may visually determine whether or not each gap has a width equal to or larger than the threshold and mark a gap having the width equal to or larger than the threshold by using a pointing device, thereby identifying the gap.

In the above exemplary embodiment, the example case has been described in which a non-blank area is divided in step 116. However, the processing in step 116 is not mandatory. For example, the divided areas may be formed by using a pointing device with reference to the gaps marked in the above-described manner.

In the above exemplary embodiment, "to conceal" indicates to perform processing for filling a non-blank area so that character images are not to be visually recognized. However, the concept of "to conceal" used in the exemplary embodiment above is not limited to this processing. For example, to apply "hatching" to a non-blank area may be included. The "hatching" indicates processing for superimposing any of a pattern, a character, and a hue, or a combination thereof on a non-blank area so that character images in the non-blank area are visually recognized only partially.

Figure 16:
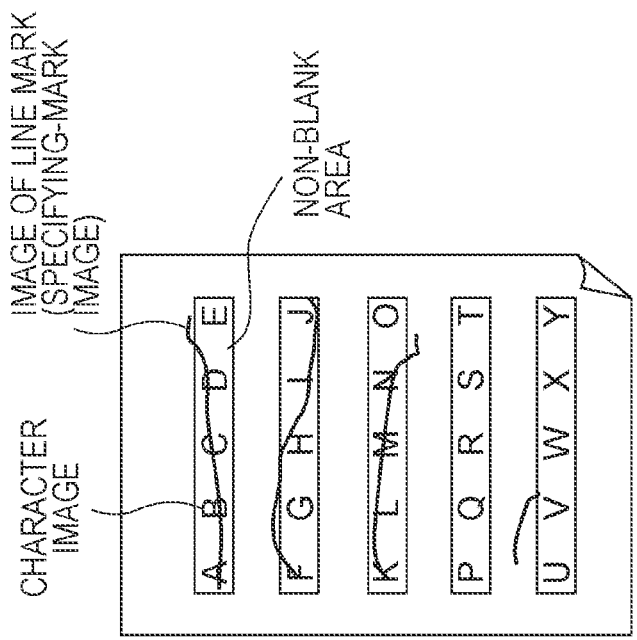
FIG. 16 describes modifications of the concealing process performed by the image processing apparatus according to the exemplary embodiment (part 1)

In the above exemplary embodiment, the example case has been described in which a divided area completely across which the specifying-mark image extends in a specific direction is set as a to-be-concealed area. However, the configuration is not limited to this example. For example, as illustrated in FIG. 16, even if the line mark does not lie over a character image and is located outside a non-blank area, the non-blank area may be concealed in a manner illustrated in FIG. 17, for example. In this case, for example as illustrated in FIG. 18, the non-blank area is concealed which includes a series of boundary line segments of divided areas completely across which the image of the specifying mark extends in the specific direction, among boundary line segments that have a predetermined length and indicate the boundary of each divided area in the specific direction. The "boundary line segments" used herein are line segments obtained by extending opposing sides of each divided area that are located side by side in the specific direction, in the upper and lower directions (the direction perpendicular to the specific direction) by a predetermined length ((e.g., a length equal to ⅓ of the height of the non-blank area) in each of the upper and lower directions from the non-blank area) as illustrated in FIG. 18, for example. As illustrated in FIG. 18 for example, the image of the line mark protrudes from the non-blank area at the positions of character images "E" and "G" but extends completely across the boundary line segments of these divided areas. Thus, the non-blank area is concealed which includes a series of boundary line segments of divided areas completely across which the image of the line mark extends, among the non-blank areas. A result of this concealment is illustrated in FIG. 17, for example. In the example illustrated in FIG. 18, the image of the line mark does not extend completely across the boundary line segments (a pair of boundary line segments) of the character image "O". Accordingly, the character image "O" is excluded from the to-be-concealed area as illustrated in FIG. 17. Even if the image of the line mark lies over one of a pair of boundary line segments of the character image "O", it is determined that the character image "O" is not specified as a to-be-concealed area, and thus is excluded from the to-be-concealed area. Additionally, parts of the image of the line mark that protrude from the to-be-concealed area are deleted as described above.

Figure 20:
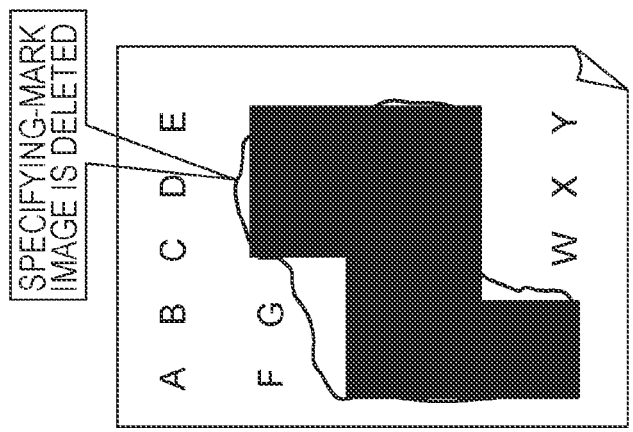
FIG. 20 describes the modifications of the concealing process performed by the image processing apparatus according to the exemplary embodiment (part 5).
Figure 19:
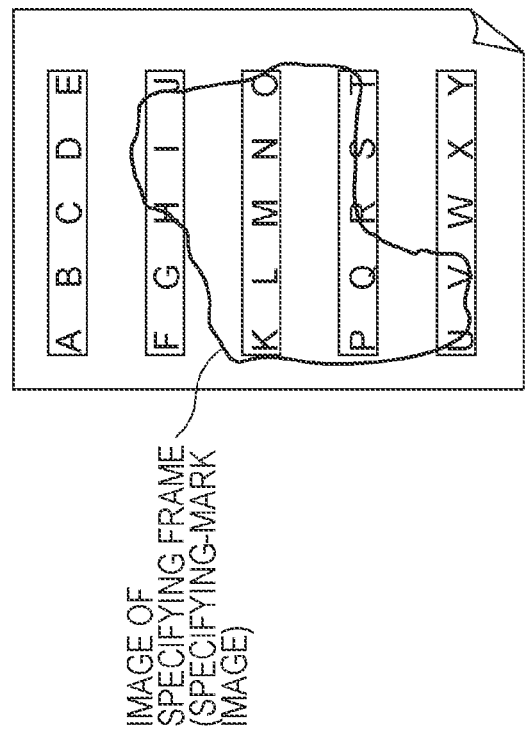
FIG. 19 describes the modifications of the concealing process performed by the image processing apparatus according to the exemplary embodiment (part 4)

The concealment may be realized with a specification method using a specifying frame, instead of the specification method using the line mark. For example, as illustrated in FIG. 19, in a case where an area surrounded by the specifying frame is specified as the specified area, even if the outline of the specified area lies outside the non-blank area including character images, the non-blank area is set as a to-be-concealed area and is concealed as long as the outline of the specified area extends completely across the boundary line segments of the character images as described above. A result of this concealment is illustrated in FIG. 20. In the example illustrated in FIG. 20, the entire area of the non-blank area is concealed which includes a series of boundary line segments of divided areas completely across which an image area equivalent to an area specified by the specifying mark represented by the specifying-mark image extends in the specific direction. In this case, parts of the specifying-mark image (the image of the specifying frame in the example illustrated in FIG. 20) that protrude from the to-be-concealed area are also deleted.

In the above exemplary embodiment, the example case has been described in which divided areas are concealed completely across which the specifying-mark image extends in the specific direction, among divided areas obtained by dividing a non-blank area. However, the configuration is not limited to this example. Among non-blank areas each including a series of boundary line segments of divided areas completely across which an image area equivalent to an area specified by the specifying mark represented by the specifying-mark image extends in the specific direction of the divided areas, a non-blank area may be concealed which has an occupied area that is occupied by the image area equivalent to the area specified by the specifying mark represented by the specifying-mark image and that is equal to or larger than a predetermined value.

In the above exemplary embodiment, the example case has been described in which an image resulting from the concealment is displayed on the display unit 10F. However, the configuration is not limited to this example. When the image processing apparatus 10 is connected to a printer, the resulting image may be recorded on a recording medium (e.g., paper) by using the printer. Alternatively, image information representing the resulting image may be stored in the secondary storage unit 10D or may be transmitted to an external apparatus and stored in a storage unit (e.g., a hard disk drive) of the external apparatus.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a blank-area identifying unit that identifies a blank area having a size exceeding a predetermined size, from a non-specifying-mark image portion of a recording area image of a recording area that includes individual images and a specifying mark specifying an area containing images among the individual images, the non-specifying-mark image portion being an image portion of the recording area image other than a specifying-mark image that represents the specifying mark, the recording area image being represented by image information; and
a concealing unit that conceals a divided area specified by the specifying-mark image, among divided areas obtained by dividing a non-blank area by a gap having a width equal to or larger than a threshold in a specific direction, among gaps between the individual images arranged in the specific direction in the non-blank area, the non-blank area being an area of the non-specifying-mark image portion of the recording area image other than the blank area identified by the blank-area identifying unit,
wherein the concealing unit conceals the divided area in response to the specifying-mark image extending completely across the divided area in the specific direction, among the divided areas obtained by dividing the non-blank area by the gap, and does not conceal remaining divided areas of the divided areas in response to the specifying-mark image not extending completely across the remaining divided areas in the specific direction, and
wherein the predetermined size is the size of the largest individual image among the individual images included in the recording area image.

2. The image processing apparatus according to claim 1, wherein the blank-area identifying unit identifies the blank area by using a frame having a size exceeding the predetermined size.

3. The image processing apparatus according to claim 1, wherein each of the individual images is constituted by an aggregate of continuously arranged pixels of a specific color.

4. The image processing apparatus according to claim 1, wherein the concealing unit conceals the entire area of the divided area specified by the specifying-mark image.

5. The image processing apparatus according to claim 1,
wherein the non-blank area includes a to-be-concealed area, and
wherein when to-be-concealed areas lie adjacent to each other with the blank area identified by the blank-area identifying unit disposed between the adjacent to-be-concealed areas, the concealing unit further conceals the blank area between the adjacent to-be-concealed areas.

6. The image processing apparatus according to claim 1,
wherein the individual images and the specifying mark that are included in the recording area have different attributes,
wherein the image processing apparatus further comprises an extracting unit that extracts the specifying-mark image from the recording area image by using at least one of the attributes of the specifying mark and an attribute of the individual images, and
wherein the blank-area identifying unit identifies the blank area from the non-specifying-mark image portion of the recording area image other than the specifying-mark image extracted by the extracting unit.

7. The image processing apparatus according to claim 1, further comprising:
a removing unit that removes a part of the specifying-mark image that is not included in a to-be-concealed area to be concealed by the concealing unit.

8. The image processing apparatus according to claim 1, wherein the individual images other than the specifying-mark image in the recording area include a group of specific images in which a plurality of specific images are arranged in the specific direction.

9. The image processing apparatus according to claim 8, wherein the plurality of specific images are a plurality of character images each representing a character.

10. The image processing apparatus according to claim 1,
wherein the specifying mark is a line mark, and
wherein an area in which the line mark is recorded is set as the specified area.

11. The image processing apparatus according to claim 1,
wherein the specifying mark is a frame mark, and
wherein an area surrounded by the frame mark is set as the specified area.

12. The image processing apparatus according to claim 1,
wherein the specifying mark is a frame mark, and
wherein an area obtained by changing the shape of an area surrounded by the frame mark is set as the specified area.

13. The image processing apparatus according to claim 1, wherein the concealing unit conceals the divided area having an occupied area equal to or larger than a predetermined area, among divided areas specified by the specifying-mark image, the occupied area being occupied by an image area corresponding to an area specified by the specifying mark represented by the specifying-mark image.

14. An image processing method, comprising:
identifying a blank area having a size exceeding a predetermined size, from a non-specifying-mark image portion of a recording area image of a recording area that includes individual images and a specifying mark specifying an area containing images among the individual images, the non-specifying-mark image portion being an image portion of the recording area image other than a specifying-mark image that represents the specifying mark, the recording area image being represented by image information; and
concealing a divided area specified by the specifying-mark image, among divided areas obtained by dividing a non-blank area by a gap having a width equal to or larger than a threshold in a specific direction, among gaps between the individual images arranged in the specific direction in the non-blank area, the non-blank area being an area of the non-specifying-mark image portion of the recording area image other than the blank area identified in the identifying,
wherein the concealing the divided area occurs in response to the specifying-mark image extending completely across the divided area in the specific direction, among the divided areas obtained by dividing the non-blank area by the gap, and concealing remaining divided areas of the divided areas does not occur in response to the specifying-mark image not extending completely across the remaining divided areas in the specific direction, and
wherein the predetermined size is the size of the largest individual image among the individual images included in the recording area image.

15. A non-transitory computer readable medium storing a program causing a computer to execute a process for image processing, the process comprising:
identifying a blank area having a size exceeding a predetermined size, from a non-specifying-mark image portion of a recording area image of a recording area that includes individual images and a specifying mark specifying an area containing images among the individual images, the non-specifying-mark image portion being an image portion of the recording area image other than a specifying-mark image that represents the specifying mark, the recording area image being represented by image information; and
concealing a divided area specified by the specifying-mark image, among divided areas obtained by dividing a non-blank area by a gap having a width equal to or larger than a threshold in a specific direction, among gaps between the individual images arranged in the specific direction in the non-blank area, the non-blank area being an area of the non-specifying-mark image portion of the recording area image other than the blank area identified in the identifying,
wherein the concealing the divided area occurs in response to the specifying-mark image extending completely across the divided area in the specific direction, among the divided areas obtained by dividing the non-blank area by the gap, and concealing remaining divided areas of the divided areas does not occur in response to the specifying-mark image not extending completely across the remaining divided areas in the specific direction, and
wherein the predetermined size is the size of the largest individual image among the individual images included in the recording area image.

* * * * *